March 10, 1953 W. C. MORRISON 2,631,201

SIGNAL AMPLIFIER

Filed Feb. 23, 1952

INVENTOR
Wendell C. Morrison
BY
ATTORNEY

Patented Mar. 10, 1953 2,631,201

UNITED STATES PATENT OFFICE 2,631,201

SIGNAL AMPLIFIER

Wendell C. Morrison, Princeton, N. J., assignor to Radio Corporation of America, a corporation of Delaware Application February 23, 1952, Serial No. 273,096

5 Claims. (Cl. 179—171)

Figure 1:
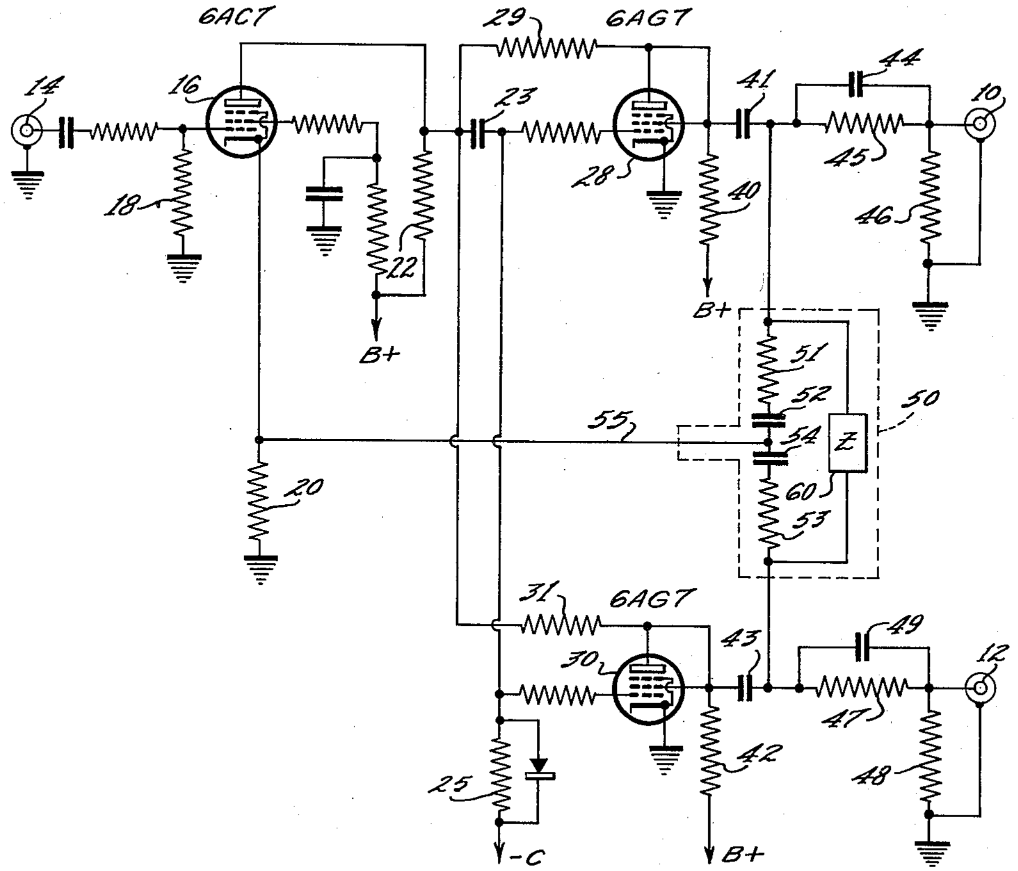

This invention relates to amplifier circuits employing degenerative feedback and more particularly to video distribution amplifiers providing signal energy for one or two output circuits while maintaining constant output signal levels whether one or both output utilization circuits are connected thereto.

Distribution amplifiers used to provide a single signal at a plurality of output positions are well known in the art as exemplified by U. S. Patent 2,479,025, issued to J. B. Rudd. Certain prior art amplifiers for video frequencies employ degenerative feedback circuits for effecting a more linear frequency response characteristic over a wide range of video frequencies. In some circuits of this type utilized for distribution at two output utilization circuits, however, it has been found that because of the degenerative feedback networks necessary to provide good frequency response, the connecting of one load will change the output signal level available at the other output terminal of the distribution amplifier.

When only two stages of amplification are included in the feedback loop of a distribution amplifier utilizing degenerative feedback and designed to drive and to properly terminate a 75 ohm cable, a separate output tube for each output terminal is generally necessary to provide good isolation between outputs over a video frequency band. With separate output tubes, but a common stage of gain in the feedback loop, the connection of the second load circuit to the amplifier results in an increased output signal to the first load over that obtained when only one load circuit is connected. This results because the feedback signal is decreased and the gain thereby increases.

When such a condition exists it is desirable to provide compensating means so that impedance changes at one output terminal do not effect the signal amplitude at the other output terminal. It is highly desirable in many applications of a video distribution amplifier that one circuit connected to the distribution system should not have its signal voltage variable with the connection of an additional circuit. For example a television transmitter cannot tolerate changes in signal level when a monitoring circuit is connected to the video system.

It is therefore an object of the present invention to provide a distribution amplifier circuit which provides a constant output signal level at either of two output terminals regardless of the utilization of the other output.

Figure 2:
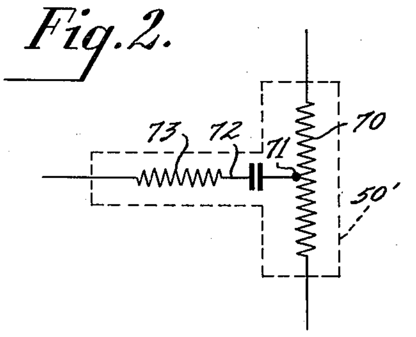
Figure 3:
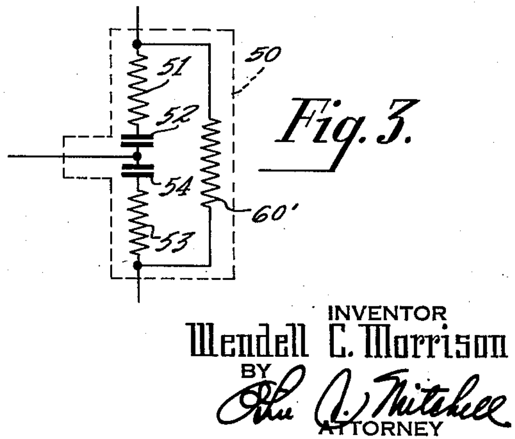

In accordance with the present invention the constant signal output level in such a system is accomplished by providing a compensation impedance network connected between two separate output circuits. The compensation network provided has such characteristics that a change in load at one utilization circuit will not effect any change in signal amplitude at the other utilization circuit. For a more clear understanding of the construction of the invention and its mode of operation, the following detailed description may be read in connection with the accompanying drawing, in which:

Figure 1 is a schematic circuit diagram of a distribution amplifier embodying the invention; and Figures 2 and 3 are schematic circuit diagrams of compensating networks constructed in accordance with the invention for utilization with circuits of the type shown in Figure 1.

In the embodiment of the invention shown in Figure 1 the distribution amplifier circuit shown will properly terminate either one or two 75 ohm cables which may be selectively coupled to the output terminals 10 and 12. Input signals may be derived from a suitable signal source connected to the input terminal 14. The particular circuit described is a video amplifier having a flat frequency response to at least 4 mc. and providing good isolation over this frequency band between the output circuits connected to terminals 10 and 12. Thus a single driver tube 16 is employed for amplifying the incoming signal applied to the grid input resistor 18 as well as a degenerative feedback wave developed at the cathode input resistor 20, which will be derived in a manner hereinafter discussed.

At the output resistor 22 of the input amplifier stage 16 there appears a signal for developing at a single input resistor 25 proper signal input potentials for amplification by the separate output distribution amplifier stages 28 and 30. Separate output coupling impedances, needed to provide the flat frequency response and proper termination for the utilization circuits, are connected to the output connection terminals 10 and 12 so that two utilization devices, coupled by the hereinbefore mentioned 75 ohm cables, may be connected thereto.

At the respective anode circuit resistors 40 and 42 of the distribution amplifier output stages 28 and 30 there is provided a signal of proper polarity for degenerative feedback when coupled to the cathode resistor 20 of the input amplifier stage 16. Such coupling results in two stages of amplification in the degenerative feedback loop which is partially effective in reducing the output impedance a suitable amount. This isolates the output circuits for proper operation with lower frequency video signals but because of reduced amplifier gain at high frequencies due to shunt capacities does not provide low enough impedance over the desired range. If the output impedance were low enough over the entire band, load changes at one terminal would have no effect on output signal amplitude at the other terminal.

The degenerative feedback network components are contained within the dotted enclosure 50 and consist of respective series connected resistors and capacitors 51 and 52, 53 and 54 which provide at the feedback lead 55 degenerative signal components taken respectively from the anode circuit of each distribution amplifier stage 28 and 30.

Further degenerative feedback is effected in each output stage 28 and 30 by means of resistors 29 and 31 for improving low frequency response.

Consider the connection of a single 75 ohm load to the output terminal 10. The load impedance on the amplifier tube 28 will thereby decrease and a lower resulting signal potential will therefore permit less degenerative feedback amplitude through the network 51, 52. Accordingly a greater gain is afforded in the input stage 16 and the signal potential across the load resistor 42 will increase. This effect is apparent whether a load circuit is connected to terminal 12 or not. Because of the decreased load impedance at one output terminal 10 which produces a decreased load for tube 28 the signal voltage thereat tends to decrease (but is nearly compensated by the increased gain), whereas the corresponding signal voltage at the alternative output terminal 12 increases since no load change has occurred for tube 30.

In accordance with the invention, however, by connecting the proper impedance network 60 between the anode circuits of the output amplifier stages 28 and 30, the cross coupling caused by a change of signal voltage due to connection of a load circuit may be cancelled out. Therefore a distribution amplifier circuit for providing two output signals for connection of a pair of utilization circuits may be constructed having a constant output signal level across either utilization circuit without regard to changes in the other utilization circuit.

The compensation impedance network 60 may be chosen to provide those characteristics desirable in any required specific circuit application. Thus in Figure 2 is shown a combined compensation and feedback network for replacing the circuit contained in the dotted box 50 and which provides a resistive cross coupling network. In this figure the compensation impedance network consists of a resistor 70 having a midtap connection 71 and a common feedback network 72 and 73 connected thereat, resulting in circuit economy. Because of the capacitance of elements 72 in Figure 2 or either elements 52 or 54 in the feedback path of Figure 1 and the capacitance of coupling capacitor 23 in the feedback amplification circuit of Figure 1 coupling the input stage 16 to the output stages 28 and 30, the feedback, and therefore the output impedance, varies with frequency. The impedance of the resistive feedback impedance 70 connected between the output impedances however does not vary with frequency and therefore this embodiment will provide a frequency selective compensation device which is balanced for only a particular frequency. This is desirable in many cases. However, should broad band compensation be of more importance, the impedance network 60 (Figure 1) may comprise capacitive or inductive components as needed to afford proper peaking and frequency selection for compensation over the entire video bandwith.

Figure 3 shows a further alternative compensating network connection wherein a purely resistive impedance 60′ may be afforded in the circuit of Figure 1. The following table of circuit values are illustrative of an amplifier built in accordance with the present invention where an impedance network of the type shown in Figure 3 was used and exact compensation was effected at 3 mc.

| | |
|---|---|
| R60′ | 43 ohms. |
| R51 and 53 | 510 ohms. |
| C52 and 54 | 1,000 mf. |
| R20 | 150 ohms. |
| R18 | 1 megohm. |
| R40 and 42 | 4,500 ohms. |
| C41 and 43 | 40 mf. |
| R45 and 47 | 100 ohms. |
| R46 and 48 | 300 ohms. |
| C44 and 49 | 160 mmf. |

To afford essentially the same operation with the circuit of Figure 2, resistor 70 equals 41 ohms center tapped, capacitor 72 is 1,000 mf. and resistor 73 is 245 ohms.

It is therefore evident that in accordance with the present invention there may be provided improved distribution amplifier circuits for providing signal distribution to a plurality of load circuits without undesirable interaction upon either the coupling or uncoupling of different utilization devices or other changes in loading.

If the features of increased bandwith and generator-end termination of the load circuit are not desired, the output coupling impedance networks (elements 44, 45, 46, 47, 48 and 49 of Figure 1), may be omitted and the theory of cross compensation still applied.

Having thus described the invention and its mode of operation, those novel features believed descriptive of the nature of the invention are described with particularity in the appended claims.

What is claimed is:

1. A distribution amplifier circuit for providing two output signals for connection of a pair of utilization circuits, said amplifier circuit providing a substantially constant signal level at one utilization circuit with changes in impedance of the other utilization circuit and comprising in combination, a source of input signals comprising an input amplifier stage, means for simultaneously applying signal energy from said stage to two separate output amplifier circuits, separate output coupling impedance means connected respectively in said separate amplifier circuits with terminals connected thereto for selectively coupling a pair of utilization circuits, means providing signal energy feedback from the output coupling impedances of both said separate amplifier circuits to a suitable connection in said input amplifier stage, and a compensation impedance network connected between both said output coupling impedances having such characteristics that changes of impedance in either of said utilization circuits provides constant signal amplitude at the other utilization circuit.

2. A circuit as defined in claim 1 wherein said compensation impedance network consists of a resistor.

3. A circuit as defined in claim 1 wherein said means providing signal energy feedback is coupled to a terminal intermediate said compensation impedance network.

4. An electronic circuit comprising in combination, an input amplifier stage including a tube having both grid and cathode input impedance means and output impedance means, a signal source connected to said grid input impedance means, a pair of output amplifier stages having input circuits connected to said output impedance, and having separate output coupling impedance means adapted for selective connection to two utilization devices, degenerative feedback means from each of said separate output coupling impedance means to said cathode input impedance means, and a compensating impedance network connected between said separate output coupling impedance means so proportioned to provide a constant output signal level at one of said separate output coupling impedance means upon changes in loading at the other output coupling impedance means.

5. A distribution amplifier circuit for providing at least two output signals for application to a pair of utilization circuits, said amplifier circuit providing a constant signal level at one utilization circuit with changes in impedance of the other utilization circuit and comprising in combination, a source of input signals comprising an input amplifier stage, means for simultaneously applying signal energy from said stage to two separate output amplifier circuits coupled with said utilization circuits, means providing signal energy feedback from the output amplifier circuits to a suitable connection in said input amplifier stage, and a compensation impedance network connected between both said output amplifier circuits having such characteristics that changes of impedance in either of said utilization circuits provides constant signal amplitude at the other utilization circuit.

WENDELL C. MORRISON.

REFERENCES CITED

The following references are of record in the file of this patent:

UNITED STATES PATENTS

| Number | Name | Date |
|---|---|---|
| 2,479,025 | Rudd | Aug. 16, 1949 |